: # 3,106,059
United States Patent Office
Patented Oct. 8, 1963

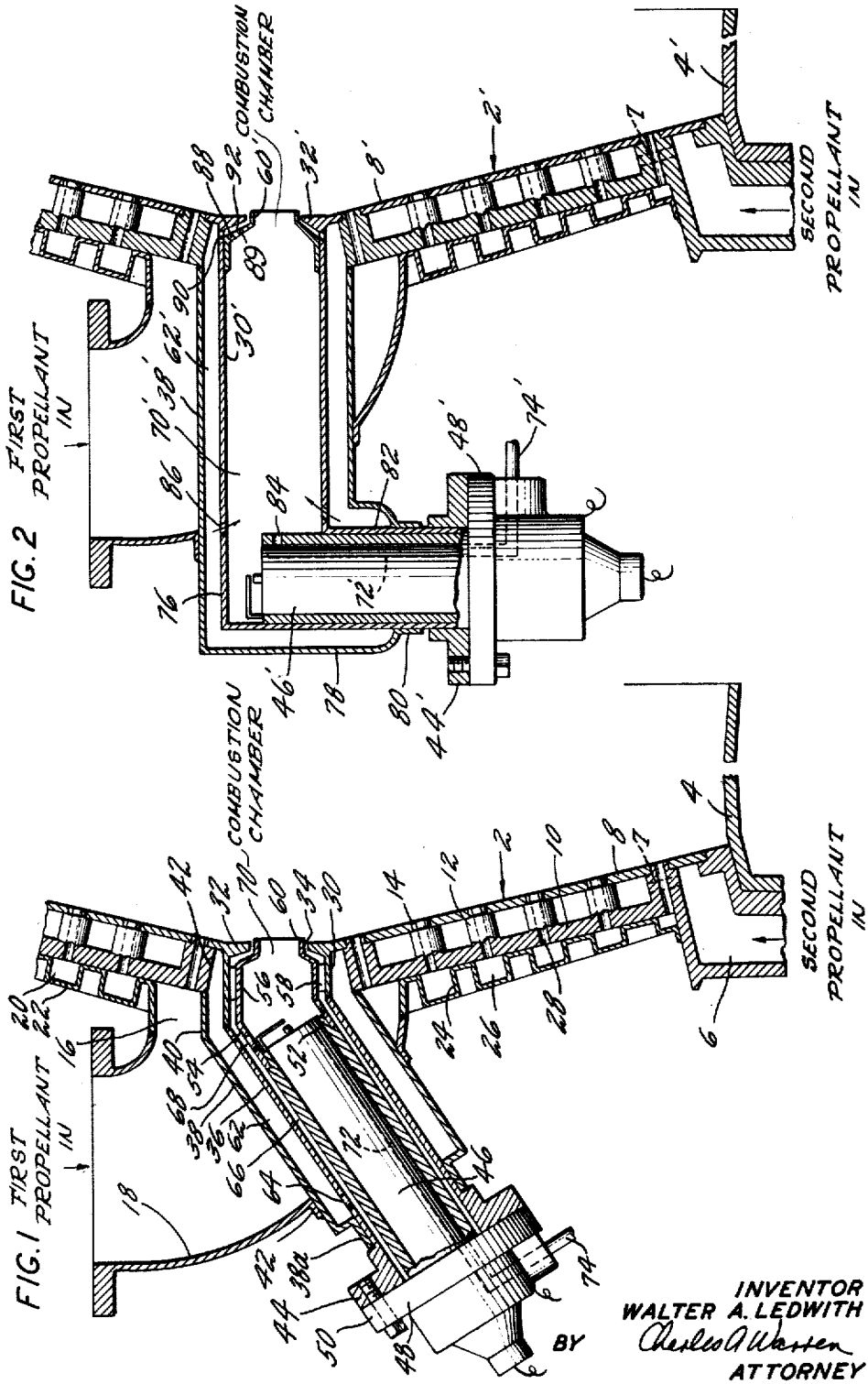

---

3,106,059
OXIDIZER INLET AND IGNITER FOR A ROCKET
Walter A. Ledwith, Glastonbury, Conn., assignor to United Aircraft Corporation, East Hartford, Conn., a corporation of Delaware
Filed Mar. 30, 1961, Ser. No. 99,633
4 Claims. (Cl. 60—35.6)

This invention relates to an injector head having a central oxidizer inlet with a central igniter.

One feature of the invention is a combined propellant inlet and igniter centrally located on the injector head and so arranged that the igniter may be removed if necessary. Another feature is the arrangement for lateral supply of the propellant as well as lateral removal of the igniter.

One feature of the invention is a supply of one fuel or propellant to the igniter space from the main propellant supply without the necessity for a separate fuel supply for ignition purposes.

Other features and advantages will be apparent from the specification and claims and from the drawing which illustrates an embodiment of the invention.

FIG. 1 is a sectional view through the injector head;
FIG. 2 is a sectional view similar to FIG. 1 of the modification.

The injector head 2 is attached at the end of the side wall 4 of a rocket system and the injector head is arranged to discharge two propellants into the combustion chamber for the rocket, the combustion chamber being the chamber defined by the side wall of the rocket and the injector head. One propellant, which is generally the fuel, is delivered through a peripheral inlet 6 on the injector head and this propellant flows through apertures 7 into the chamber between an inner plate 8 and a secondary plate 10 axially spaced therefrom. The secondary plate 10 has a plurality of projections 12 thereon which engage with the plate 8 to maintain the proper spacing therebetween. The fuel discharges through the plate 8, which may be porous or which may have openings that define annular nozzles 14 surrounding the ends of the projections 12.

The other propellant is delivered to the injector head through a central opening 16 having an angularly arranged conduit 18 by which the propellant reaches the injector head. The other propellant is distributed into a chamber of space 20 defined between a cover plate 22 and the secondary plate 10. The plate 22 has projections thereon which are shown as spirally arranged corrugations 24 to define in effect a plurality of spirally arranged passages 26 which are in alignment with axial passages 28 located in the projections 12. The passages 28 constitute nozzles for the discharge of propellant from the chamber 20 into the combustion chamber. The plate 22 is brazed or welded to the secondary plate 10 where the corrugations are in contact therewith as shown. This arrangement of cover plate is shown and claimed in the copending application of Horrocks, Serial No. 99,735, filed March 31, 1961.

The plate 8 has an integral centrally located sleeve 30 to which is attached, as by brazing, a ring 32 to define a central opening 34 in the injector head. At the end of the sleeve 30 remote from the ring 32 is attached an angularly positioned sleeve 36. Surrounding and spaced from the sleeve 36 is another sleeve 38 which is attached at its inner end to an axially positioned sleeve 40 brazed or otherwise attached to a central opening 42 in the secondary plate 10. Sleeve 38 projects through a flanged opening 42 in the duct 18 and is brazed or otherwise attached thereto.

At its outer end, the sleeve 38 is reduced in diameter and has an integral sleeve portion 38a fitting snugly around and brazed to the sleeve 36. Adjacent to the portion 38a is an attachment ring 44 brazed to the outer end of the sleeve 36. An igniter in the form of a spark plug 46 having a mounting flange 48 thereon fits within and in spaced relation to the inner sleeve 36. The mounting flange 48 is suitably attached as by bolts 50 to the attachment ring 44. The igniter has at its inner end a shoulder 52 which is in slidable engagement with a ring 54 located within and spaced from the sleeve 36. The ring 54 is integral with an axially positioned sleeve 56 located within the sleeve 30 and spaced therefrom by suitable spacing webs 58.

The sleeve 56 has at its inner end an inwardly projecting ring 60 positioned within and spaced from ring 32 which is attached to the plate 8. Propellant from the space between the plates 8 and 10 enters the chamber 62 between the sleeves 36 and 38 by flowing around the innermost row of projections 12 and then flows into the space 66 within the sleeve 36 through opening 64 in the sleeve 36 adjacent to the outer end thereof. This propellant then flows through the space 66 toward the injector head and through an opening 68 in the ring 54 into the pre-ignition space 70 defined within the sleeve 56 at the end of the spark plug or igniter.

The other propellant enters the pre-ignition chamber 70 through a passage 72 provided in the igniter itself. Passage 72 is supplied with propellant through the conduit 74 which may communicate with duct 18.

As shown in FIG. 2, the injector head is similar to that shown in FIG. 1 having the rocket side wall 4' and the injector head 2'. The inner plate 8' of the injector head has the axial sleeve 30' to which is attached a sleeve extension 76. Surrounding the sleeve extension 76 is a sleeve 38'. At the outer end of the sleeve 38' is an angularly positioned extension 78 which has at its outer end an inturned flange 80 engaging with the outer surface of an inner sleeve 82. The sleeve 78 is brazed or otherwise attached to the outer end of the sleeve 38' and the sleeve 82 is similarly secured to the outer end of the sleeve extension 76.

The sleeve 82 receives slidably therein the igniter 46' which is held in position by the mounting flange 48' removably attached to the mounting ring 44' which in this arrangement is secured to the outer end of the sleeve 82. Oxidizer through a conduit 74' flows through a passage 72' in the igniter and thence through a lateral passage 84 into the pre-ignition space 70' which in this arrangement is considerably larger than in the arrangement of FIG. 1. Fuel enters the chamber 70' through passage 86 in the sleeve extension 76 to mix with the oxidizer to form a combustible mixture in the pre-ignition chamber.

At the inner end of the sleeve 30' instead of the inner ring 56 of FIG. 1 a ring 88 is cylindrical at one end and attached thereat to the inner surface of the sleeve 30' and having a conical portion 89 leading to a smaller diameter inner end 60' positioned within and spaced from the ring 32'. Fuel inlet passage 90 through the sleeve 30' admit fuel to the annular space 92 between rings 32' and 88 for the purpose of cooling these elements.

In operation, when propellants are admitted to the propellant inlet 6 and to the duct 18, or to the comparable elements in FIG. 2, a combustible mixture is formed in the pre-ignition chamber 70 or 70'. This mixture is ignited by the igniter and discharges in the form of a torch through the ring 60 or 60' into the main combustion chamber. Obviously, when the combustbile mixture is ignited in the pre-ignition chamber a combustible mixture is also formed in the main combustion chamber to be ignited by the torch from the pre-ignition chamber. The ignition is generally timed to make sure that the pre-ignition chamber is producing a torch before a combustible mixture is formed in the main chamber. The arrangement for the flow of fuel through the space 62 or 62' serves to cool the walls of the pre-ignition chamber and also serves to keep the igniter cool enough to prevent damage thereto throughout the normal operation of the rocket. The arrangement also provides for the easy removal of the igniter without the necessity for substantially dismantling the injector head and also is so arranged that no leakage of either oxidizer or fuel can form a combustible mixture in any enclosed part of the injector head.

It is to be understood that the invention is not limited to the specific embodiment herein illustrated and described, but may be used in other ways without departure from its spirit as defined by the following claims.

I claim:

1. An injector head for a rocket combustion chamber having a plurality of sets of nozzles for the discharge of propellants therethrough, said head having axially spaced chambers, one for each propellant and from which the propellants are supplied to the nozzles, a centrally located supply duct for one of the propellants including a first sleeve having a lateral connection at a first end thereof to a propellant supply, a second sleeve within and spaced from said first sleeve to form a first annular passage commencing with one of said chambers, a third sleeve within and spaced from said second sleeve to define a second annular passage, said second sleeve having transverse openings therein joining said first and second annular passages at the opposite end from said first end and said third sleeve having transverse openings at said first end for the flow of propellant from said second annular passage into the interior of said third sleeve, and an igniter within said third sleeve and terminating short of said third sleeves communicates with the rocket combustion chamber is formed within said third sleeve adjacent said igniter and having a passage therethrough for a propellant.

2. An injector head for a rocket combustion chamber as in claim 1 in which the space within the third sleeve has a discharge opening communicating with the rocket combustion chamber.

3. An injector head for a rocket combustion chamber as in claim 2 in which the space between the second and third sleeve communicates with the rocket combustion chamber through an annular passage surrounding the said outer passage.

4. An injector head for a rocket combustion chamber having a plurality of sets of nozzles in the head for the discharge of propellants therethrough into the combustion chamber, said head having on the outer end thereof an angularly arranged centrally positioned propellant duct communicating with said head, a sleeve extending through the wall of said duct and communicating with a central ignition opening in the injector head, a second sleeve within and spaced from said first sleeve to form an annular passage therebetween, an igniter within said second sleeve having an axial passage therein for a propellant, said second sleeve defining a pre-ignition chamber located at the end of the igniter and having a centrally arranged outlet into the rocket combustion chamber, openings in the wall of said second sleeve at the end away from the combustion chamber for the flow of propellant from said annular passage into the pre-ignition chamber, said annular passage between said sleeves communicating with the propellant passages in the injector head so that propellant flows through said annular passage in a direction away from the combustion chamber thence through said second sleeve openings into said pre-ignition chamber, said second sleeve having a ring located therein and attached to the inner end thereof and defining said centrally arranged outlet into the combustion chamber from said pre-ignition chamber, and passages in said second sleeve located adjacent said ring and between said ring and combustion chamber for the discharge of propellant from said annular passage over the surface of said ring.

References Cited in the file of this patent

UNITED STATES PATENTS

| 2,741,085 | Prentiss | Apr. 10, 1956 |
| 2,754,656 | Munger | July 17, 1956 |
| 2,902,823 | Wagner | Sept. 8, 1959 |

FOREIGN PATENTS

| 616,481 | Great Britain | Jan. 21, 1949 |

UNITED STATES PATENT OFFICE
CERTIFICATE OF CORRECTION

Patent No. 3,106,059                                October 8, 1963

Walter A. Ledwith

It is hereby certified that error appears in the above numbered patent requiring correction and that the said Letters Patent should read as corrected below.

Column 3, line 36, for "sleeves communicates with the rocket combustion" read -- sleeve transverse openings so that a pre-ignition --.

Signed and sealed this 7th day of April 1964.

(SEAL)
Attest:

ERNEST W. SWIDER

Attesting Officer

EDWARD J. BRENNER

Commissioner of Patents